US006611843B1

(12) United States Patent
Jacobs

(10) Patent No.: US 6,611,843 B1
(45) Date of Patent: Aug. 26, 2003

(54) SPECIFICATION OF SUB-ELEMENTS AND ATTRIBUTES IN AN XML SUB-TREE AND METHOD FOR EXTRACTING DATA VALUES THEREFROM

(75) Inventor: Ronald Michael Jacobs, San Jose, CA (US)

(73) Assignee: Docent, Inc., Mountain View, CA (US)

( * ) Notice: Subject to any disclaimer, the term of this patent is extended or adjusted under 35 U.S.C. 154(b) by 0 days.

(21) Appl. No.: 09/940,867

(22) Filed: Aug. 27, 2001

Related U.S. Application Data

(60) Provisional application No. 60/244,061, filed on Oct. 26, 2000.

(51) Int. Cl.[7] .............................................. G06F 17/30
(52) U.S. Cl. ...................................... 707/102; 707/5
(58) Field of Search ............................. 707/1, 2, 3, 4, 707/5, 10, 102, 513, 514; 711/133

(56) References Cited

U.S. PATENT DOCUMENTS

| | | | | |
|---|---|---|---|---|
| 6,263,332 B1 | * | 7/2001 | Nasr et al. ...................... | 707/5 |
| 6,366,934 B1 | * | 4/2002 | Cheng et al. ................ | 707/513 |
| 6,457,103 B1 | * | 9/2002 | Challenger et al. .......... | 711/133 |

OTHER PUBLICATIONS

Shanmugasundaram et al. ("Relational Databases for Querying XML Documents: Limitations and Opportunities").*
Rafael Berlanga, Maria Jose Aramburu and Salvador Garcia "Efficient Retrieval of Structured Documents From Object–Relational Databases").*
Masatoshi Yoshikawa Hiroyuki Kato and Hiroko Kinutani ("Design Framework of a Database for Structured Documents with object links") 1998.*

* cited by examiner

*Primary Examiner*—Diane D. Mizrahi
*Assistant Examiner*—Yicun Wu
(74) *Attorney, Agent, or Firm*—Sawyer Law Group LLP

(57) ABSTRACT

A method and system for specifying sub-elements and attributes in a sub-tree and for extracting data values is disclosed. The method and system include defining content elements as recursively hierarchical sub-trees by defining a first XML ELEMENT in a document type definition, where each content element includes a top-level element and zero or more embedded subelements, and wherein leaf nodes in the sub-trees represent data values. The method and system further include extracting data values from the content elements by using the description of the first XML ELEMENT to recursively traverse each top-level element and extract the data values from the sub-tree.

12 Claims, 17 Drawing Sheets

| | | |
|---|---|---|
| ☑ *XML* | | |
| ☑ *DOCTYPE* Repository | | |
| ▲ Site-Repository | | |
| | = version | 2.5 |
| | ()– *Comm...* | Node-ID for the library world |
| | ☑ External-Reference | external-id = node_world_library |
| | ()– *Comm...* | ID for the administrator user |
| | ☑ External-Reference | external-id = user_sa |
| | ()– *Comm...* | ID for the release publisher user |
| | ☑ External-Reference | external-id = user_rp |
| | ()– *Comm...* | ID for the system group of all learners |
| | ☑ External-Reference | external-id = system_group_all_learners |
| | ()– *Comm...* | ID for the system group of all publishers |
| | ☑ External-Reference | external-id = system_group_all_publishers |
| | ()– *Comm...* | ID for the system group of all release publishers |
| | ☑ External-Reference | external-id = system_group_all_release_publishers |
| | ()– *Comm...* | ID for the system group of all administrators |
| | ☑ External-Reference | external-id = system_group_all_administrators |
| | ()– *Comm...* | Site properties for users |
| | ☑ Site-Properties | kind = User |
| | ()– *Comm...* | Site properties for activities |
| | ☑ Site-Properties | kind = Activity |
| | ()– *Comm...* | Site properties for units |
| | ☑ Site-Properties | kind = Unit |
| | ()– *Comm...* | Site properties for views |
| | ☑ Site-Properties | kind = View |
| | ()– *Comm...* | Site properties for bookmarks |
| | ☑ Site-Properties | kind = Bookmark |
| | ()– *Comm...* | Site-specific content for testing |
| | ☑ Site-Content | |

40 brackets rows from version through system_group_all_administrators
42 brackets the Site-Content row 18b    FIG. 5

| Content (Tag Name: A1) |
|---|
| Content (Tag Name: A2) |
| Content (Tag Name: A2) |
| Content (Tag Name: A5) |
| Content (Tag Name: A4) |
| Content (Tag Name: A4) |
| Content (Tag Name: A4) |
| Content (Tag Name: A4) |
| Content (Tag Name: A4) |
| Content (Tag Name: A2) |

FIG. 8

Content (Tag Name: A1)
- Content (Tag Name: A3)
  - Content (Tag Name: A2)
- Content (Tag Name: A3)
  - Content (Tag Name: A2)
- Content (Tag Name: A1)
  - Content (Tag Name: A3)
    - Content (Tag Name: A2)
  - Content (Tag Name: A4)
  - Content (Tag Name: A3)
    - Content (Tag Name: A2)

FIG. 9

| | |
|---|---|
| < ! ELEMENT | Element (Link?, (Attribute \| Subelement) ? ) > |
| < ! ATTLIST | Element id ID #IMPLIED > |
| < ! ELEMENT | Link EMPTY > |
| < ! ATTLIST | Link ref IDREF #REQUIRED > |
| < ! ELEMENT | Attribute (#PCDATA) > |
| < ! ELEMENT | Subelement (Name, Row?, (Attribute \| Subelement) ? ) > |
| < ! ELEMENT | Name (#PCDATA) > |
| < ! ELEMENT | Row (#PCDATA) > |

| | System-Group | |
|---|---|---|
| | = id | system_group_all_learners |
| | ( ) ID | 10 |
| | ( ) Title | All Learners |
| | ( ) Authorized-Role | Learner |

FIG. 15 begin transaction —534

- - Insert system group 'All Learners' —522 select @cursor_3 = id from lc_enumtypes
where
enumclassid = 4 and title = 'Learner'
} 524 go
insert into lc_group (
    id,
    title,
    cardinality,
    authorizedrole
)
values (
    10,
    'All Learners',
    1,
    @cursor_3
)
} 526 go commit transaction —536

FIG. 17A

-- Insert system group 'All Learners' — 528

```
select id into cursor_3 from lc_enumtypes
where
    enumclassid = 4 and title = 'Learner';
```
⎫ 530

```
insert into lc_group (
    id,
    title,
    cardinality,
    authorizedrole
    )
values (
    10,
    'All Learners',
    1,
    cursor_3
    ) ;
```
⎫ 532 commit; — 538

FIG. 17B

SPECIFICATION OF SUB-ELEMENTS AND ATTRIBUTES IN AN XML SUB-TREE AND METHOD FOR EXTRACTING DATA VALUES THEREFROM

CROSS-REFERENCE TO RELATED APPLICATIONS

This Application claims the benefit of Provisional Application Ser. No. 60/244,061 filed Oct. 26, 2000.

This application is related to co-pending application Ser. No. 09/699,768 entitled "Automatic Generation Of SQL Statements That Create And Populate Vendor-Independent SQL Databases", and to co-pending application Ser. No. 09/699,217 entitled "Describing Hierarchical XML Content For Automatic Transformation Into SQL Statements", assigned to the Assignee of the present application and filed and the same date as the present application.

FIELD OF THE INVENTION

The present invention relates to SQL databases, and more particularly to a method and system for describing hierarchical XML content and for translating the XML content into SQL.

BACKGROUND

Almost all databases in use today are based on a "relational model" in which the database data is perceived by its users as a collection of tables. The tables in a relational database include a row of column names specifying one or more column fields, and zero or more data rows containing one value for each of the column fields. Each column in a database stores data regarding a particular concept or object. A database schema defines the tables and the type of data that each table can contain.

All requests to access the database data are usually handled by database system software referred to as a database management system (DBMS). The DBMS supports database operations for interrogating and processing the data in the database, such as adding tables to the database, inserting data into existing tables, updating tables, deleting tables, and retrieving data from existing tables. Such commands include SELECT, INSERT, UPDATE and DELETE, which are examples of statements from the standard database language known as SQL (Structured Query Language). SQL commands can be used to interactively work with a database by a user, or can be embedded within a programming language to interface to the database.

An application program may be written to access the database through the DBMS. Before the application program may be used, however, the database tables must first be created and populated with data during an initialization process.

One approach to populating the database with data is to have a programmer generate a SQL file containing SQL statements necessary to create the relational database base and to populate the database with the data. This approach, however, is tedious and error prone because should the database schema be changed in any way, the programmer must update the SQL file accordingly. In addition, records in a relational database are provided with unique indexes, which have to be manually assigned. If an index is changed, then the programmer has to make sure that all the other tables referring to the index are also updated. This process is unscalable because as the number of tables in the database grows and/or the number of databases supported by the programmer increases, the process becomes unmanageable.

Another approach that may be used to populate the database with data is to hard code a software program with information necessary to generate a file containing the necessary SQL statements. This approach, however, shares the disadvantages with the prior approach in that whenever the structure of the database needs to be changed, the program that generates the SQL must also be changed.

A further problem is that not all SQL languages are the same. The American National Standards Institute (ANSI) has standardized the SQL language, but it does not cover all the bases. The major database management systems supporting SQL, including DB2, SQL/DS, Oracle, Sybase, SQLbase, INFORMIX and CA-OpenIngres (Ingres), each has its own enhancements, quirks and tricks that, for all intents and purposes, makes SQL non-standard. Therefore, moving the program that creates SQL code from one vendor's SQL database to another would require rewriting portions of the program to convert the SQL statements. As stated above, this type of maintenance is error-prone and unusable.

Accordingly, what is needed is an improved method for generating SQL statements for generating and populating vendor-independent SQL databases. The present invention addresses such a need.

SUMMARY

The present invention provides a method and system for specifying sub-elements and attributes in a sub-tree and for extracting data values. The method and system include defining content elements as recursively hierarchical sub-trees by defining a first XML ELEMENT in a document type definition, where each content element includes a top-level element and zero or more embedded subelements, and wherein leaf nodes in the sub-trees represent data values. The method and system further include extracting data values from the content elements by using the description of the first XML ELEMENT to recursively traverse each top-level element and extract the data values from the sub-tree.

According to the method and system disclosed herein, a generic solution is for automatically generating SQL is provided that may be used with different client data and with different vendor SQL databases.

DESCRIPTION OF THE DRAWINGS

FIG. 5 is a block diagram showing a graphical example of the top-most levels of an example site-dependent XML information set called "site repository".

FIG. 8 is a block diagram illustrating an example collection of content elements from the content section.

FIG. 9 is a block diagram illustrating an expanded view of the top-level content element having tag name A1.

FIG. 15 is a diagram illustrating an example from the content section of the site-independent XML information set shown in FIG. 4.

FIG. 17A shows SQL generated for version 7 of Microsoft's RDB product called "SQL Server"

FIG. 17B shows SQL generated for version 8 of Oracle's RDB product.

DESCRIPTION OF THE INVENTION

The present invention relates to describing hierarchical content and for automatically translating the content into SQL statements for initializing a SQL database. The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a general mechanism for defining a SQL database and database content in XML, and for automatically populating the SQL database using program instructions that do not need to be modified when either the data or the database schema is modified.

Figure 1:
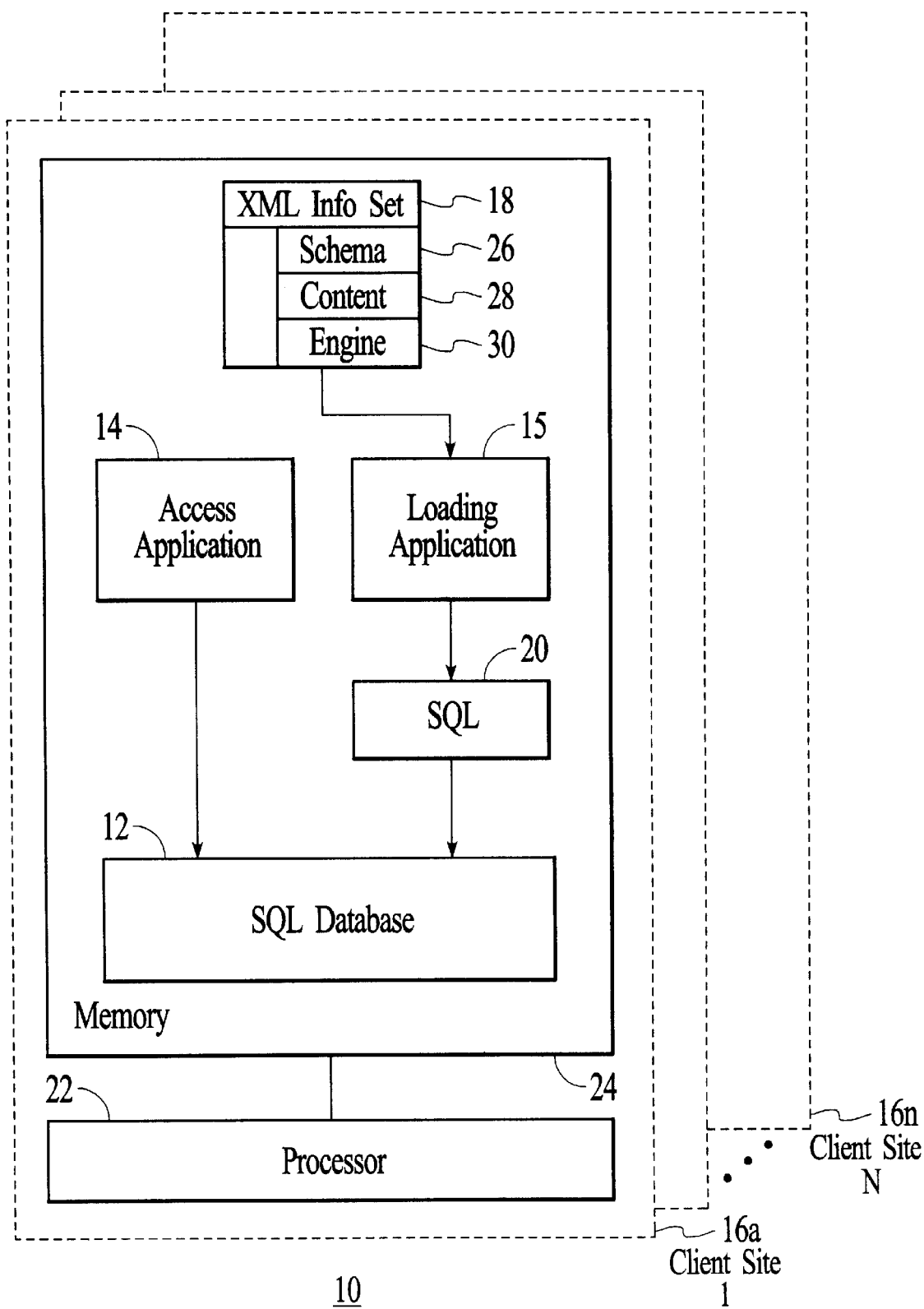
FIG. 1 is a block diagram of an example relational database system environment in which the present invention may be used.

FIG. 1 is a block diagram of an example relational database system environment in which the present invention may be used. The system 10 includes a SQL database 12 for storing database data, and an access application 14 that accesses the SQL database 12. The SQL database 12 may reside on the same or different computer than the access application 14. The SQL database 12 is based on the relational model in which the data is organized as a collection of tables. A processor 22 and associated main memory 24 support the execution of the SQL database 12 and the access application 14.

The access application 14 is intended be installed at different client sites 16, where each client may use a SQL database 12 provided by a different vendor. Although some of the database content required for the application will be independent of the client site 16, the database schema may be different for each client site 16, and each client site 16 will store client-specific content in the SQL database 12. Vendor-specific SQL statements must therefore be written at each client site 16 that creates the database tables and loads the database with the client's content.

As stated above, a software program could be hard coded to output the appropriate SQL statements, but a separate software program might have to be written for each client site 16, and each software program would have to be modified every time the database schema changed or the content was moved to another type of SQL database 12.

The present invention provides a method and system for automatically generating SQL statements that create and populate vendor independent SQL databases 12. According to the present invention, the client content is modeled in an XML information set 18 and input to a loading application 15, which automatically translates the content into SQL statements. A SQL file 20 containing the SQL statements is then input into the SQL database 12 to create the database tables automatically and to insert the content into the tables for access by the access application 14. In a preferred embodiment, the loading application 15 comprises Java instructions that process the XML information set 18 to generate SQL that initializes the SQL database 12.

Figure 2:
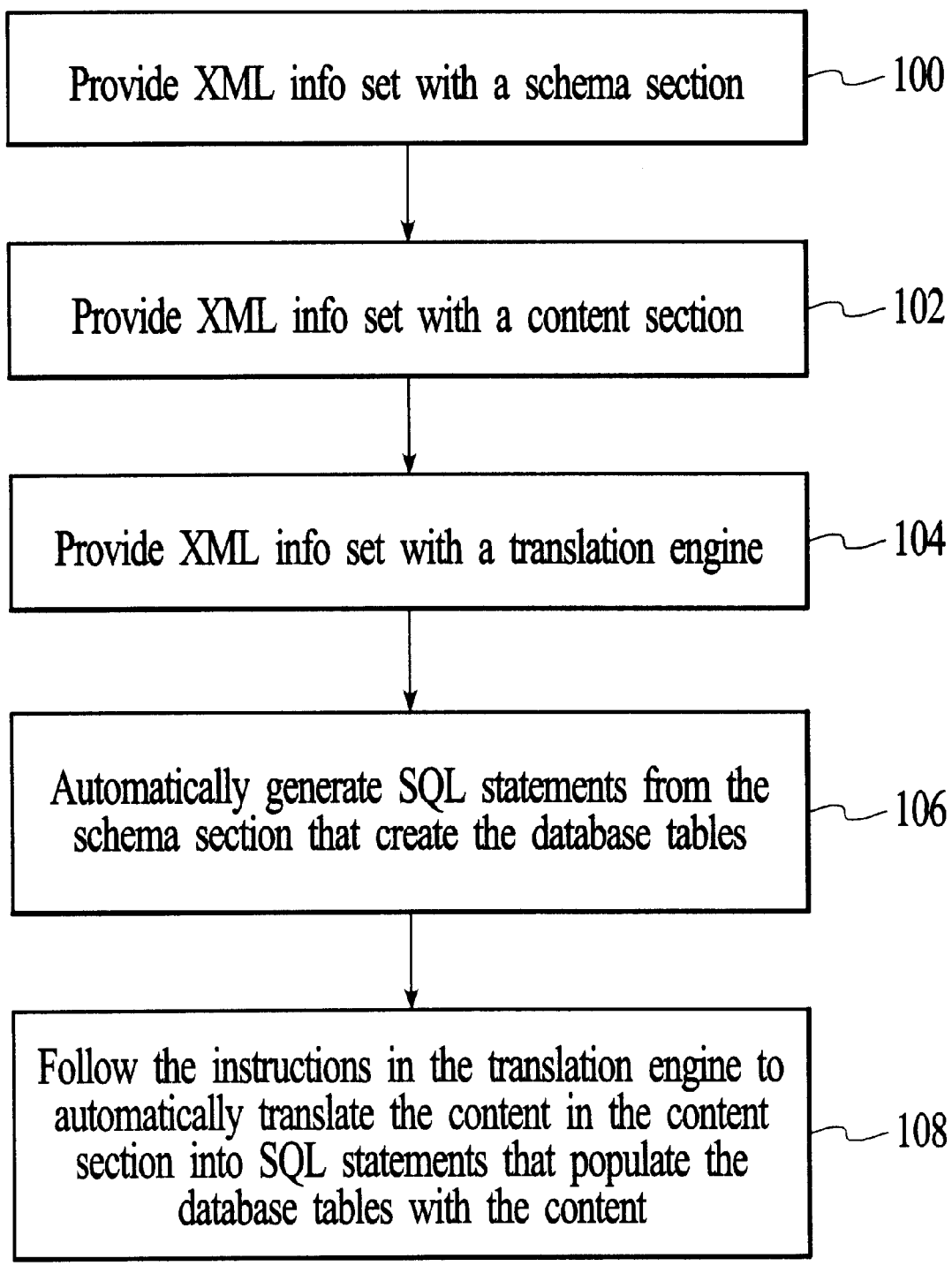
FIG. 2 is a flow chart illustrating a process for automatically generating SQL statements that create and populate vendor-independent SQL databases is shown in a preferred embodiment of the present invention.

Referring now to FIG. 2, a flow chart illustrating a process for automatically generating SQL statements that create and populate vendor-independent SQL databases 12 is shown in a preferred embodiment of the present invention. The process begins by providing the XML information set 18 with a schema section 26 containing data that describes all the tables comprising the database and their physical structure and properties in step 100. Along with the schema section, the XML information set 18 is also provided with a content section 28 for holding the content to be loaded into the SQL database 12 in step 102.

In a preferred embodiment, the content to be loaded into the SQL database 12 is structured in accordance with a business data model, rather than a traditional relational database model. In other words, information is structured in a human-oriented hierarchical way, rather than structured in a table (column and row) format. In a preferred embodiment, the content is stored as hierarchical object-oriented XML elements.

XML typically represents data of a hierarchical data structure ('tree structure'), i.e., data with a traditional direct parent-child relationship, where each child has a single parent. Thus, an XML document can be represented as a tree of elements. However, object-oriented data typically has objects that refer to each other. Standard XML currently has no support for representing data having a graph structure, e.g., a directed acyclic graph (DAG), where a child has multiple direct parents. The assignee of the present invention has developed such a system, as described in copending patent application Ser. No. 09/691,966 entitled "METHOD AND SYSTEM FOR ACHIEVING DIRECTED ACYCLIC GRAPH (DAG) REPRESENTATIONS OF DATA IN XML", filed on Oct. 18, 2000, which is herein incorporated by reference. A document type definition (DTD) is augmented for allowing description of the DAG in an XML information set 18 and for providing functionality for a document object model access application 14 interface (DOM API) to process the XML information set 18.

Figure 3:
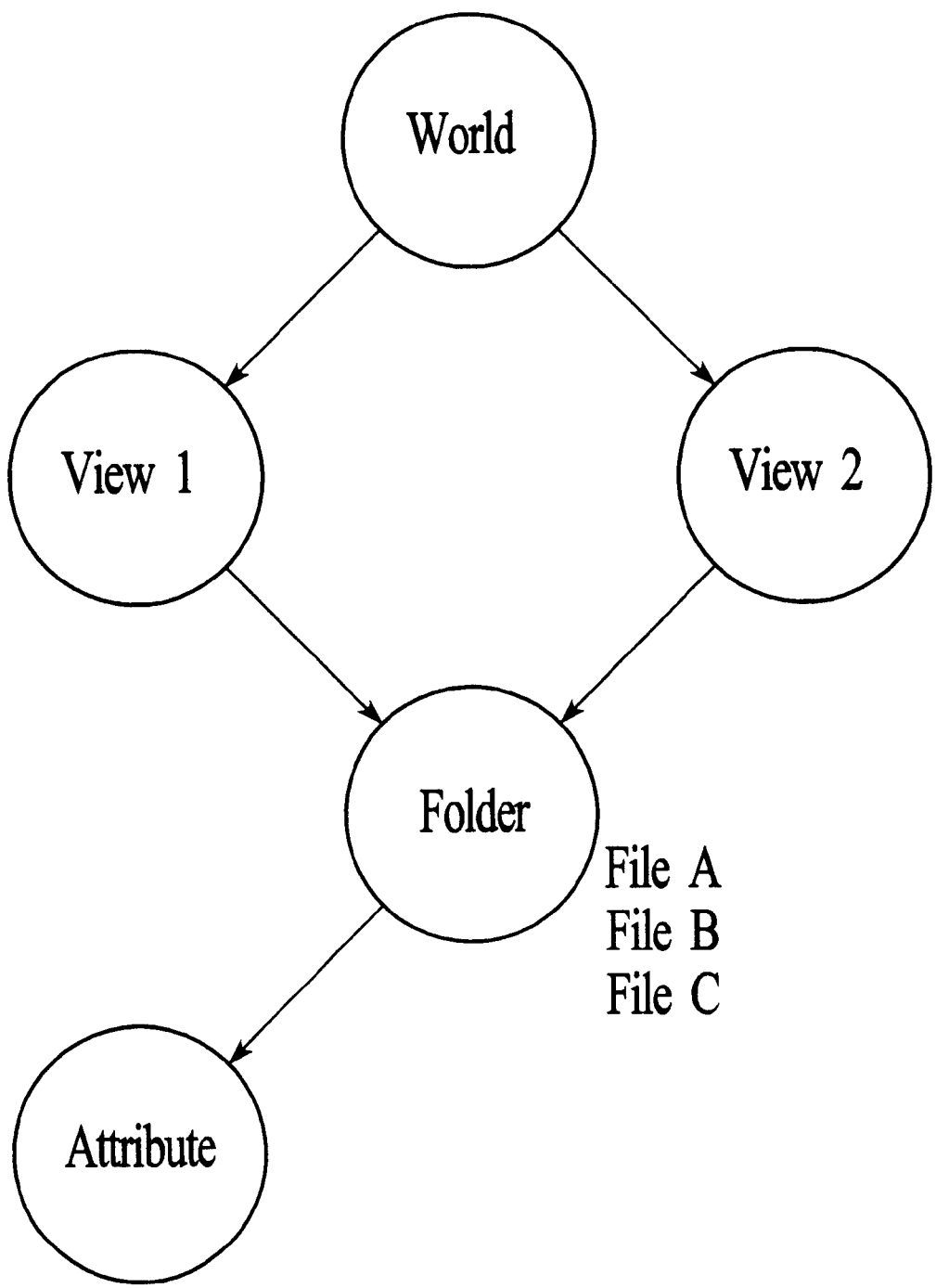
FIG. 3 is a diagram illustrating example object-oriented data relationships that may be represented as an XML information set in accordance with the present invention.

FIG. 3 is a diagram illustrating example object-oriented data relationships that may be represented in an XML information set 18 in accordance with the present invention. As is shown, the object-oriented data is represented as a DAG, where a child node may have multiple direct parents.

Referring again to FIG. 2, the XML information set 18 is also provided with a translation engine 30 in step 104, which contains instructions for how the content is to be translated into SQL. The loading application 15 then accepts the XML information set 18 as input in step 108 and automatically generates SQL statements from the schema section 26 that create the database tables. The loading application 15 also follows the instructions in the translation engine 30 to automatically translate the content in the content section into SQL statements that populate the database tables with the content. More specifically, the translation engine 30 describes to the loading application 15 how to extract individual data elements within the content based on the type of content being translated, and how to form the SQL statements from those data elements that will insert the data into the tables.

According to the present invention, by describing the database schema, the content, and instructions for translating the content in the XML information set 18, the loading application 15 does not need to be modified for client-specific schemas or content, or for the type of vendor SQL database 12 being used.

In a preferred embodiment, the content required for the application includes site-independent content that the application requires regardless of which client site 16 the application is being installed, and site dependent content, i.e., the client data. According to one aspect of the present invention, the site-independent content is separated from the site dependent content using two different XML information sets: a site-independent XML information set, and a site dependent XML information set.

In one alternative embodiment, both the site-independent and the site-dependent content and the translation engine 30 could be implemented using one XML information set, or the translation engine 30 could be implemented in a separate XML information set.

Figure 4:
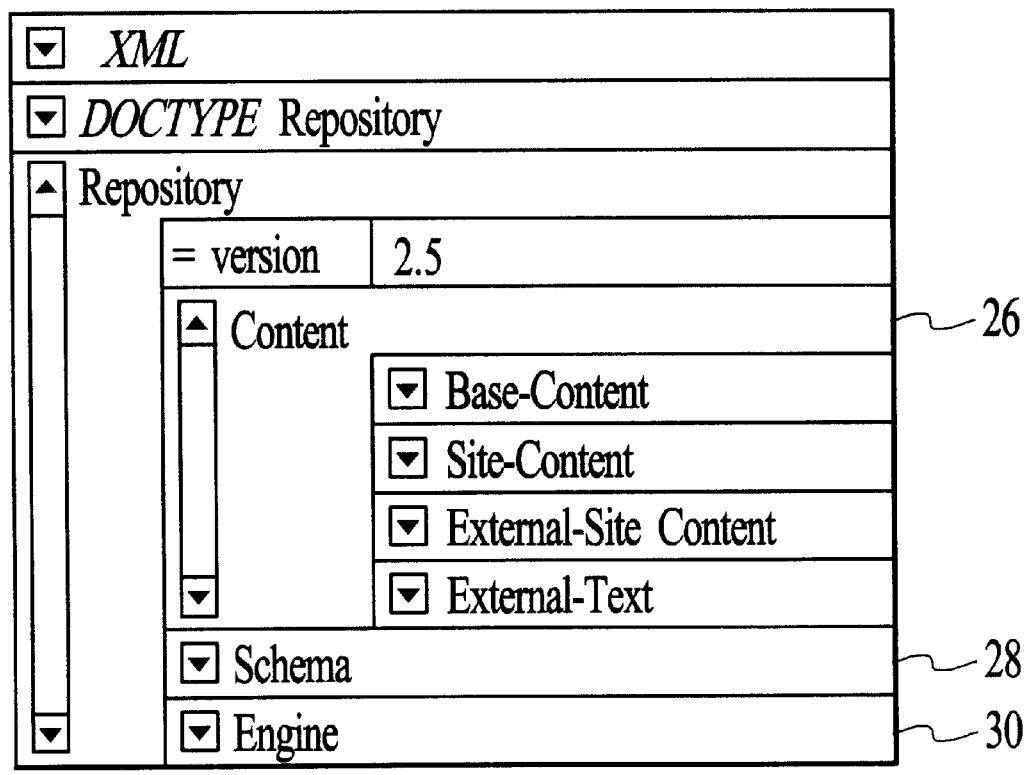
FIG. 4 is a block diagram showing a graphical example of the top-most levels of an example site-independent XML information set, called "repository.xml".

FIG. 4 is a block diagram showing a graphical example of the top-most levels of an example site-independent XML information set, called "repository.xml", in a preferred embodiment of the present invention. The site-independent XML information set 18a includes three sub-elements; the content section 26, the schema section 28, and the translation engine 30. As stated above, the content section 26 contains all information required to implement the SQL database 12 for the application and which is independent of the data being modeled.

FIG. 5 is a block diagram showing a graphical example of the top-most levels of an example site-dependent XML information set 18b called "site-repository.xml". The site dependent XML information set 18b includes an external reference section 40, and the site dependent content 42 (e.g., the client data). The external reference section 40 includes references to the site-independent XML information set 18b to allow the site-dependent content to be treated as a sub-tree of the site-independent content. The site dependent content section includes hierarchical data that is structured similar to that of the content section in the site-independent XML information set 18, but that allows the client to extend the SQL database 12 (e.g., adding columns) without changing the database schema.

Figure 6:
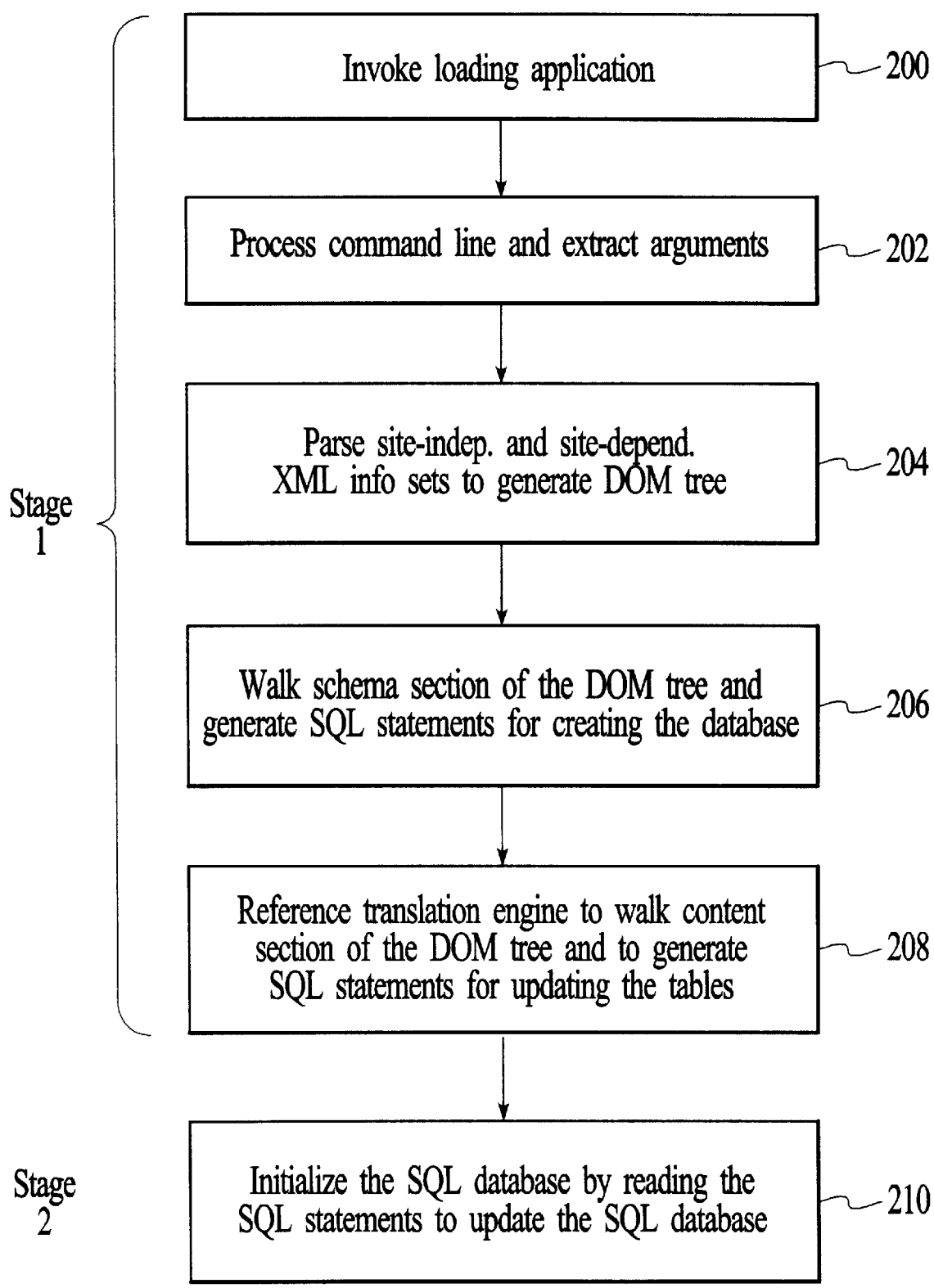
FIG. 6 is a flow chart illustrating the process for initializing the SQL database using the loading application and the repository XML information set in accordance with a preferred embodiment of the present invention.

FIG. 6 is a flow chart illustrating the process for initializing the SQL database using the loading application 15 and the XML information sets 18a and 18b in accordance with a preferred embodiment of the present invention. In a preferred embodiment, the process for initializing a relational database is a two-stage process. In stage one, the XML information sets 18 are translated into SQL through the implementation of steps 200 through 208.

The process begins invoking the loading application 15 in response to a user or administrator typing in a command line with arguments in step 200. The command line is then processed and the arguments extracted and validated in step 202. Examples of arguments include specifying the types and locations of the XML information sets 18 to be translated.

Using an XML parser, the site-independent and site dependent XML information sets 18a and 18b are read and parsed, generating a single "in-memory" DOM tree in step 204. During the parsing, the DTD is referenced in order to validate the XML information sets 18a and 18b.

After the XML information sets 18 are parsed, the schema section of the site-independent DOM tree is walked, and the loading application 15 generates SQL statements from the data therein that create the relational database tables and indices in step 206. Thereafter, the loading application 15 references the instructions in the translation engine 30 to walk the content sections of the site-independent and site dependent XML information sets 18a and 18b of the DOM tree and to generate SQL statements therefrom for inserting, updating, and deleting the specified data from the tables in step 208.

Finally after the stage one processing, stage two is initiated in step 210 whereby the SQL statements generated in stage one are read and the relational database is updated, effecting its initialization.

The method for describing the content and processing the content in accordance with the present invention provides a generic solution that may be used with different client data and with different vendor SQL databases without modifying the instructions in the loading application 15. Thus, the need to "hardcode" a program with client or site-dependent information is obviated. With the present invention, the process used by the loading application 15 for creating the SQL database and for transforming the content into SQL is site-independent, as described below.

Figure 7:
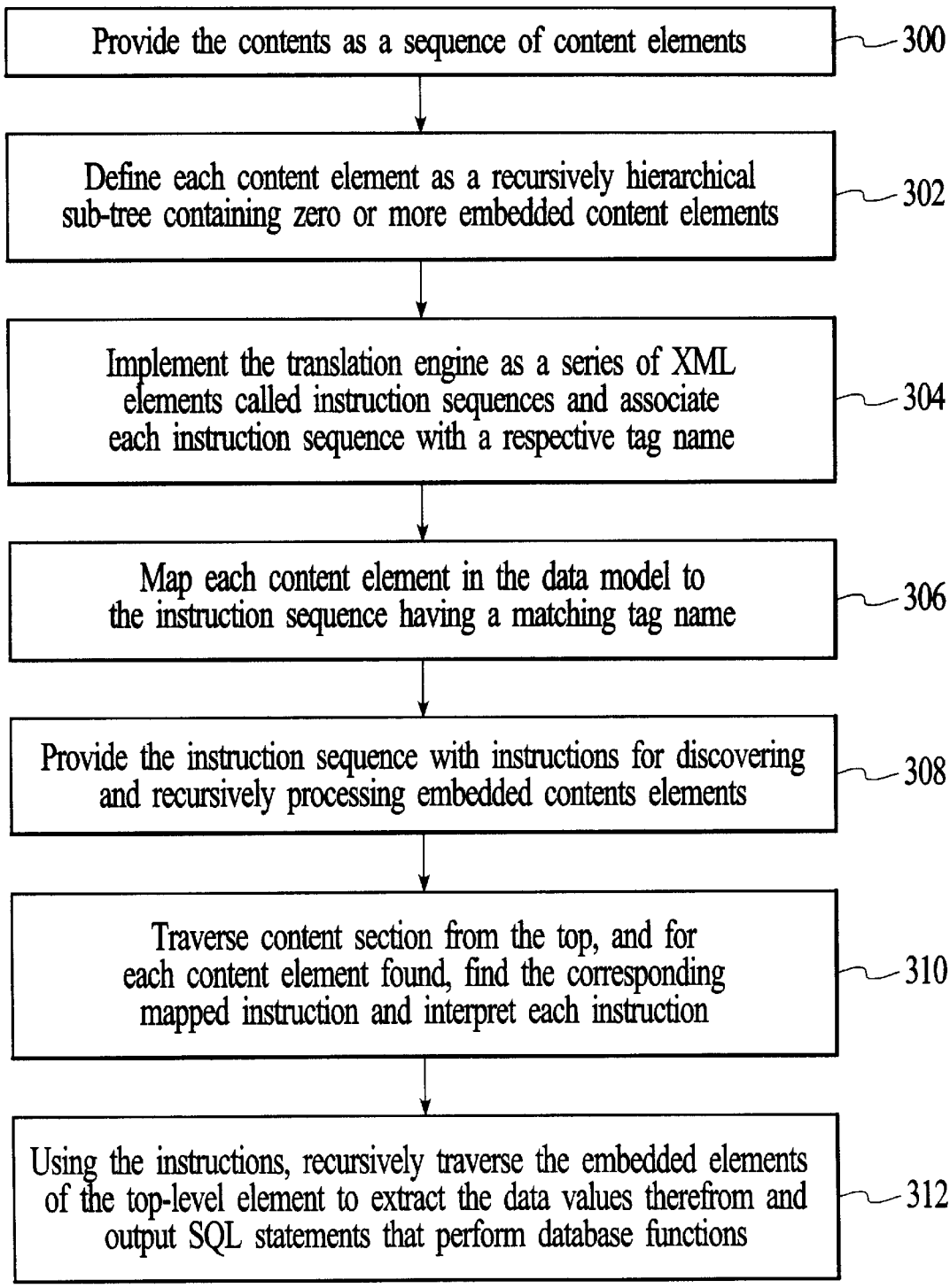
FIG. 7 is a flow chart illustrating a process for transforming hierarchical XML content into SQL statements in accordance with a second aspect of the present invention.

Describing Hierarchical XML Content for Automatic Transformation into SQL Statements FIG. 7 is a flow chart illustrating a process for describing hierarchical XML content for automatic transformation into SQL statements in accordance with a second aspect of the present invention. The process begins by representing the content in the XML information set as a sequence of content elements in step 300. Each content element represents individual data items with respect to the business model. As is standard XML practice, all XML elements are associated with tag names.

FIG. 8 is a block diagram illustrating an example collection of content elements from the content section 28. Each of the content elements has been assigned tag names from a fixed set of tag names comprising names A1 through A5. In this particular example, tag name A3 has not been assigned to any particular element within the content section 28. Each element tag name is defined in the XML information set 18 as having a specific format and structure.

Referring again to FIG. 7, due to the nature of the data model, each content element may be defined as a recursively hierarchical sub-tree containing zero or more embedded content elements in step 302. Accordingly, there are top-level content elements and embedded content elements.

FIG. 9 is a block diagram illustrating an expanded view of the top-level content element having tag name A1. As shown in the example, the top-level content element A1 has three embedded content elements A3, A3, and A1, and each embedded content element contains at least one embedded content element. Embedded content element A1 is similar to the top-level content element A1 in that the first embedded content element occurring in both elements is embedded content element A3. Therefore, element tag name A1 may be defined in the XML information set 18 such that any content element bearing that tag name must have at least one embedded content element, and the first embedded content element must be an A3 element. There may be other child elements for each of the elements depicted in the FIG. 9. These other elements are not depicted because only the top-level elements are relevant to this discussion.

Typically, embedded content elements that are leaf nodes in the tree comprise data values, such as strings, that either identify a table or row in the database, or are just values that need to be inserted, deleted, or updated. For example, a top level content element may include an embedded content element that has a data value "Parts" that identifies the "Parts" table, followed by many embedded content elements having data values that need to be inserted into the "Parts" table.

Referring again to FIG. 7, the next step required for processing the hierarchical content is to implement the translation engine 30 as a series of XML elements called instruction sequences and to associate each instruction sequence with a respective tag name in step 304.

Figures 10, 11:
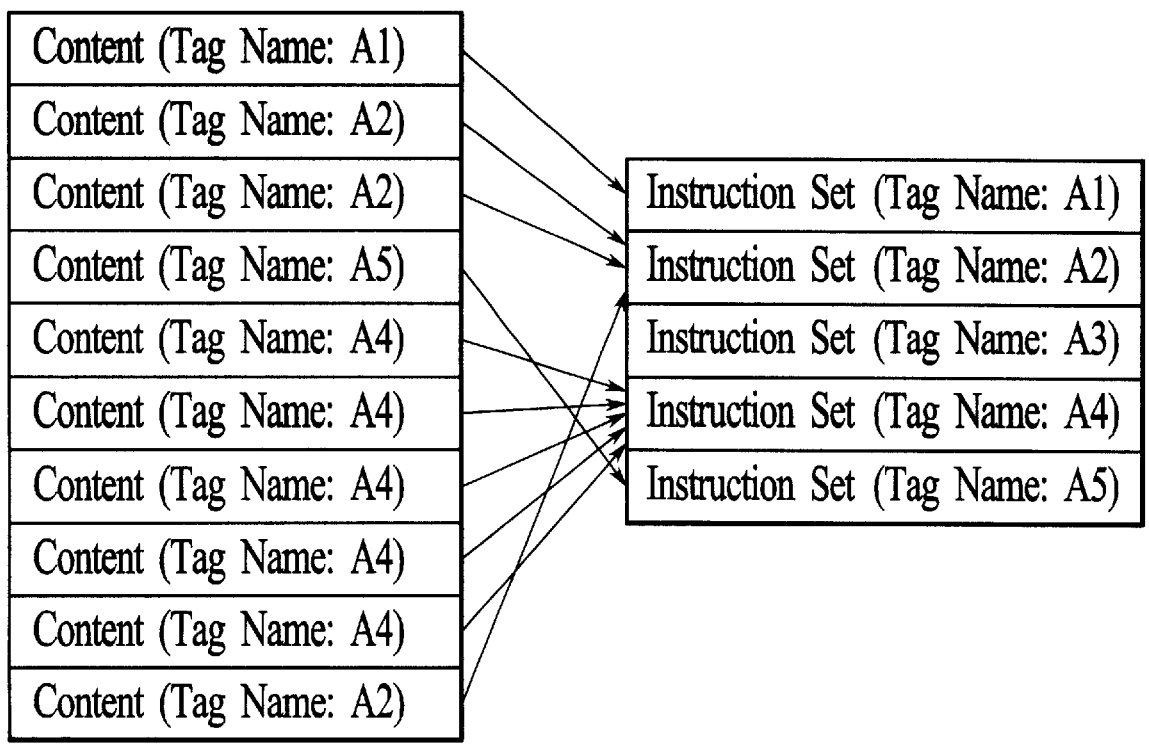
FIG. 10 is a block diagram illustrating example instructions for a translation engine corresponding to the example content section of FIG. 8.
FIG. 11 is a block diagram illustrating a graphical representation of the mapping of the content elements to the translation engine instruction sequences by tag name.

FIG. 10 is a block diagram illustrating example instructions for translation engine 30 for tranlating the example content section 28 shown in FIG. 8. The translation engine 30 is shown comprising five different instruction sequences, where each instruction sequence is associated with tag names A1 through A5, respectively. Although only five tag names are shown, the translation engine 30 may comprise any number of instruction sequences and respective tag names, and each instruction sequence may comprise a series of individual program instructions.

Referring again to FIG. 7, each content element in the data model is then mapped to the instruction sequence having a matching tag name in step 306.

FIG. 11 is a block diagram illustrating a graphical representation of the mapping of the content elements to the translation engine 30 instruction sequences by tag name. For example, all content elements having tag name A2 are mapped to the instruction sequence having tag name A2. Thus, each content element in the content section 28 will have a corresponding instruction sequence in the translation engine 30 by virtue of matching tag names. FIG. 11 only depicts the mapping of top-level content elements to their corresponding instruction sequences. However, the embedded content elements must also be discovered and processed in a correct order interspersed with the top-level content elements.

Therefore, referring again to FIG. 7, the instruction sequences are provided with instructions for discovering and recursively processing embedded content elements in step 308. Instructions for discovering and recursively processing content elements must be provided because the correct order for processing the content depends on the application-specific content data model. During the translation of the content, the loading application 15 traverses the content section 28 of the site-independent XML information set 18 from the top, and for each content element found, the loading application 15 finds the corresponding mapped instruction sequence and each instruction within the instruction sequence is interpreted in step 310. The loading application 15 uses the instruction sequence to recursively traverse the embedded elements of the top-level element to extract the data values therefrom and output SQL statements that perform database functions in step 312. The database functions may include selecting table rows specified by the data elements, inserting the data values into the specified rows, and inserting comments into the SQL file 20, for instance.

According to the present invention, two instructions for recursively processing embedded content elements are provided: a process instruction and a process-group instruction. A sequence of process instructions is used to effect processing embedded content elements with different tag names that are ordered primarily by tag name and secondarily lexically. The process group instruction contains zero or more instances of the process instruction. An instruction sequence may include one or more of these instructions.

Figure 12A:
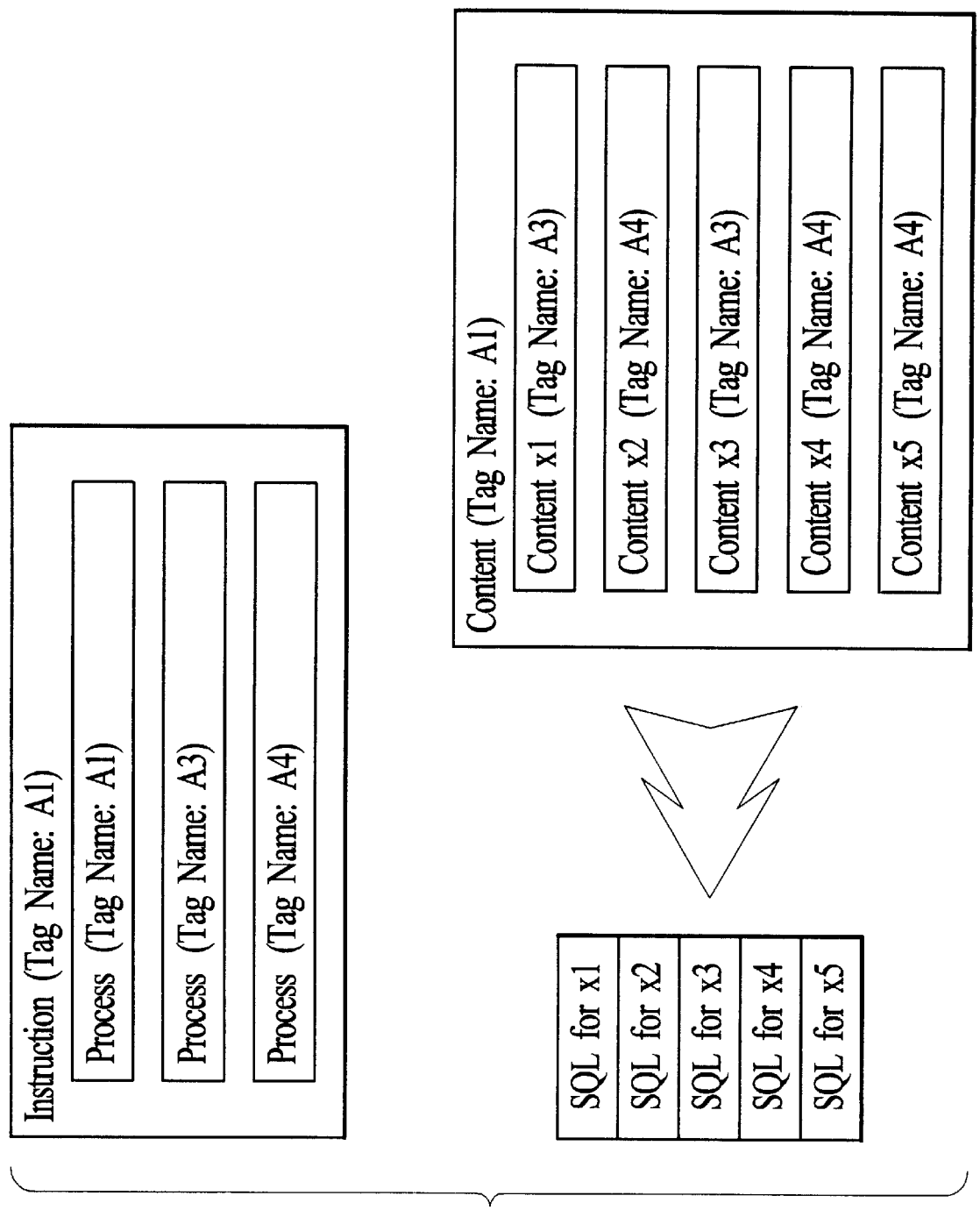
FIG. 12A is a block diagram illustrating the processing of a content element using the process instruction.

FIG. 12A is a block diagram illustrating the processing of a content element using the process instruction. The example shows an example instruction sequence A1 having a sequence of three process instructions for processing content elements A1, A3, and A4, respectively. Content element A1 includes five embedded content elements labeled x1 through x5. When instruction sequence A1 is invoked, the process instructions are processed in order by tag name. First, process instruction A1 maps to content elements A1, but there are none so the process continues. Next, process instruction A3 maps to the embedded content elements A3, which are then processed in order of occurrence to produce SQL for embedded content elements x1 and x3, respectively. Next, process instruction A4 maps to embedded content elements A4, which are then processed in order of occurrence to produce SQL for embedded content elements x2, x4 and x5, respectively.

In some instances, it is desirable to process content elements in lexical order, rather than grouped by tag name as done with process instructions. This is accomplished by the process-group instruction, which contains a sequence of process instructions for processing embedded content elements having different tag names first lexically and secondarily by tag name.

Figure 12B:
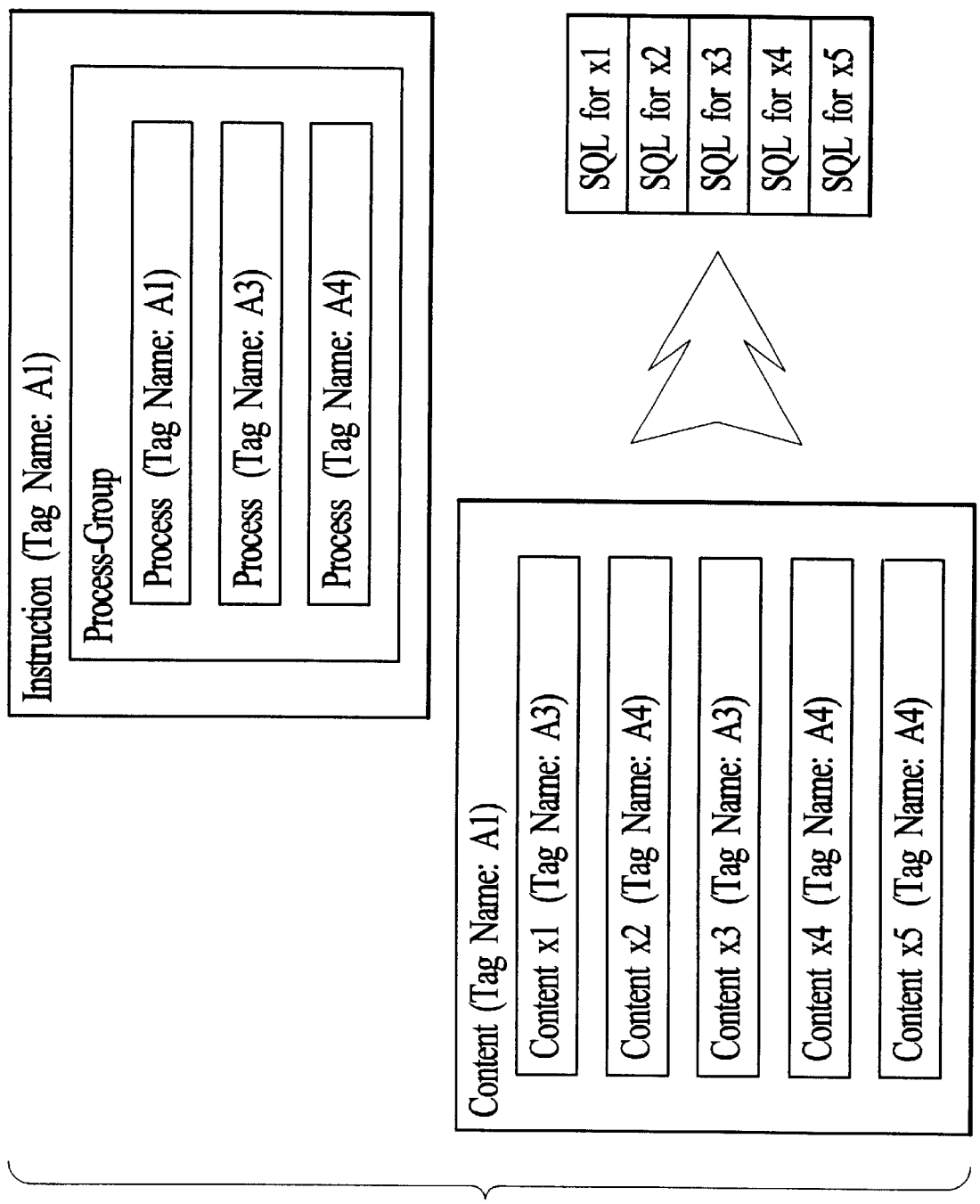
FIG. 12B illustrates the processing of the content element A1 shown in FIG. 12A using the process-group instruction.

FIG. 12B illustrates the processing of the content element A1 shown in FIG. 12A using the process-group instruction. The example shows an example instruction sequence A1 comprising a single process group instruction that includes embedded process instructions for processing content elements A1, A3, and A4, respectively. During processing, each embedded content element found by the process and process group instructions is mapped to the appropriate instruction sequence by matching tag names (the same as for a top-level content element). Now the embedded content elements are processed in the order that they appear to produce the correct SQL output (i.e., x1, x2, x3, x4, and x5). The process instruction and the process group instruction may optionally contain instructions that are executed before (and/or after) each embedded content element is processed.

Specification of Sub-elements and Attributes in an XML Sub-tree and Method Extracting Data Values Therefrom As described above, a top-level content element is the head of a sub-tree, and all data needed to generate the output SQL is hidden within the sub-tree. The problem is that there may be zero, one, or multiple children nodes in each sub-tree, and because in an XML DAG each node may have multiple parents, there may be multiple ways of traversing the tree to arrive at a particular node during processing. This implies that a node may need to be processed multiple times in slightly different contexts. Therefore, code element enumeration is a difficult task.

In a third aspect of the present invention, a method for specifying sub-elements and attributes in a sub-tree and for extracting data values therefrom is provided. The method involves describing in further detail the process for describing individual content elements in the XML information set 18 (FIG. 7, step 302), and the process for recursively traversing a content element for extracting data values and inserting the data values into the SQL statements (FIG. 7, steps 308–312).

Figures 13, 14:
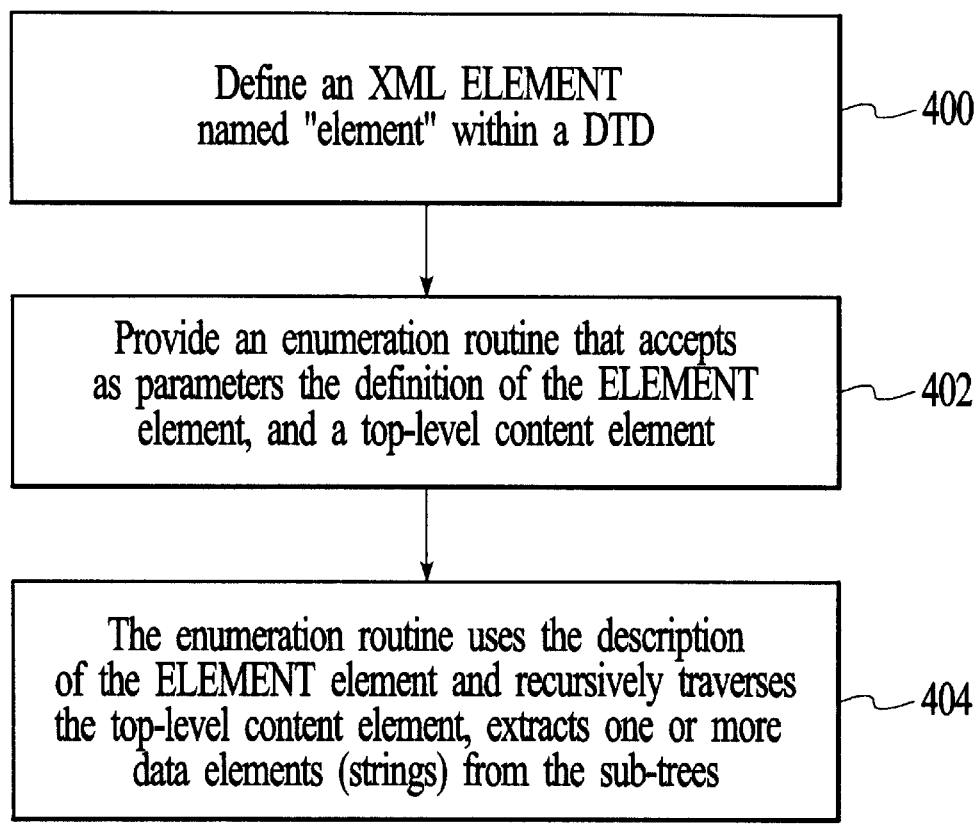
FIG. 13 is a flow chart illustrating a process for specifying sub-elements and attributes in an XML sub-tree and for extracting data values in accordance with a third aspect of the present invention.
FIG. 14 illustrates an excerpt from the DTD showing the structure of an XML Element named "element" in a preferred embodiment of the present invention.

FIG. 13 is a flow chart illustrating a process for specifying sub-elements and attributes in an XML sub-tree and for extracting data values. First, content elements are defined as recursively hierarchical sub-trees by defining an XML element named "element" within the DTD in step 400. The process for extracting data values and inserting the data values into the SQL statements is implemented as follows. An enumeration routine is provided that accepts as parameters a description of the ELEMENT element, and a top-level content element in step 402. The enumeration routine uses the description of the ELEMENT element and recursively traverses the top-level content element, extracts one or more data elements (strings) from the sub-trees in step 404.

FIG. 14 illustrates an excerpt from the DTD showing the structure of an XML Element named "element" in a preferred embodiment of the present invention. Under the constraints of DTD, The first two lines defines an "element" tag as either an XML "ELEMENT" or as an XML "ATTRIBUTE" (ATTLIST). An XML "ELEMENT" defines what children an element bearing the tag name "element" may have. An XML ATTRIBUTE defines what attributes an element bearing the tag name "element" may have.

For an ELEMENT element, its first child may be an optional "link" followed by an optional "attribute" or a "sub-element". If a content element does not have any children, then during processing its mapped instruction sequence will return any top-level string associated with that element.

The ELEMENT Link is empty and has one attribute "ref" of type IDREF in accordance with the standard XML specification that is required, i.e., the text inside the value of the element Link has to appear exactly once elsewhere in the file inside the value of another attribute that is type ID.

The XML ELEMENT attribute defines that element may have an attribute of "#PCDATA", which stands for a text string. The XML ELEMENT sub-element is defined as having a required "name", an optional "row" element, and optionally either an "attribute" or a "sub-element".

The foregoing principles will now be explained by way of example.

FIG. 15 is a diagram illustrating an example content sub-tree from the content section 28 of the site-independent XML information set 18a shown in FIG. 4. The example business model content shown in FIG. 15 includes a concept of system groups. Each system group in the model can have three properties: a unique ID 500, a title 502, and an authorized role 504. The value of each of these three properties must be loaded into the proper column of the proper table in the SQL database 12. The top-level element of the content sub-tree has been given the XML tag name of "system-group."

Figure 16:
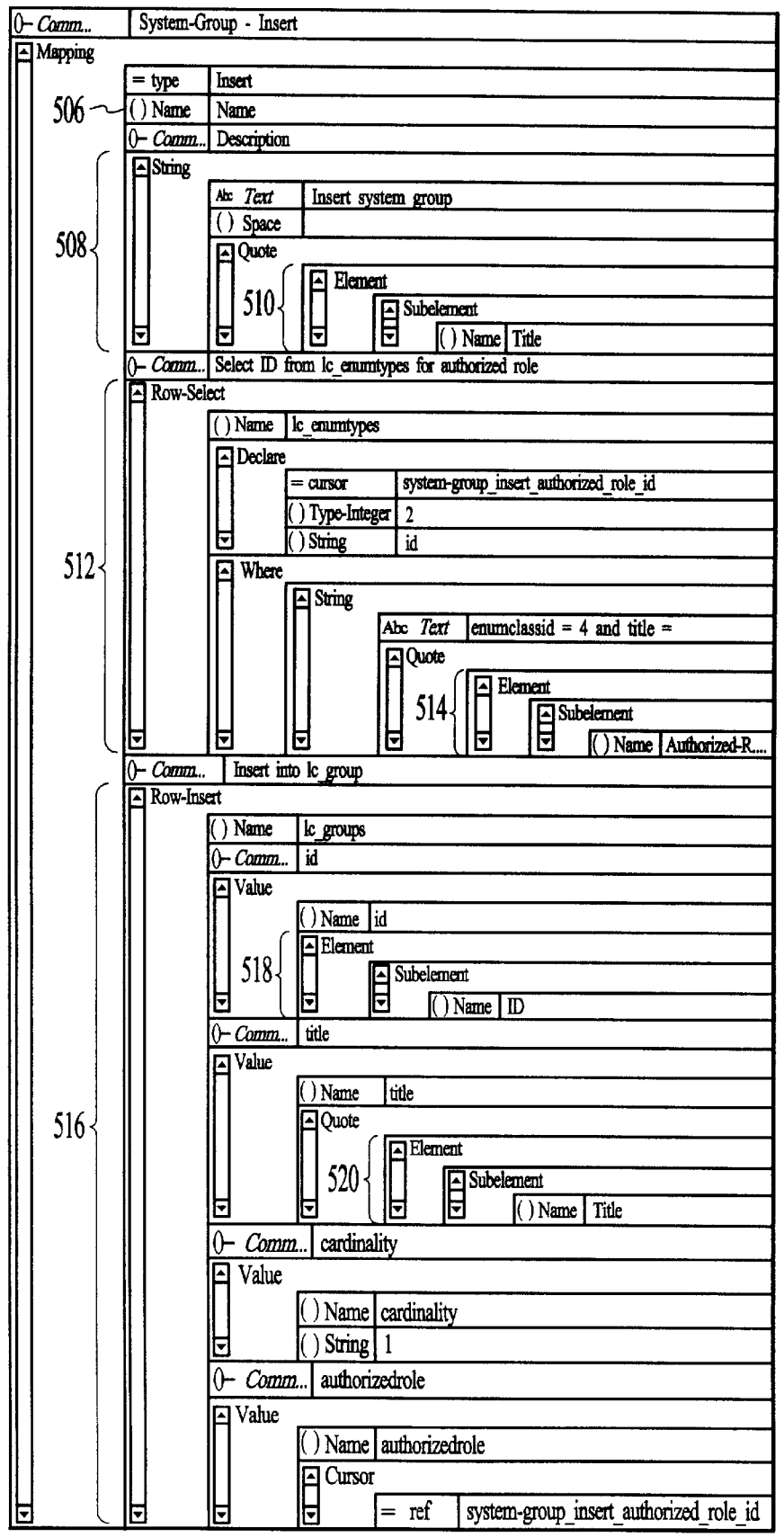
FIG. 16 depicts an instruction sequence from the translation engine 30 that the loading application 15 uses to processes the example content sub-tree of FIG. 15.

FIG. 16 depicts an instruction sequence from the translation engine 30 that the loading application 15 uses to process the example content sub-tree of FIG. 15. The example content sub-tree in FIG. 15 is mapped to the instruction sequence shown in FIG. 16 because the tag name of the top-level element of the content sub-tree, "system-group," matches the tag name 506 of the instruction sequence. The instruction sequence contains three instructions 508, 512, 516 that process the content sub-tree, in order, to produce the example generated SQL of FIGS. 17A and 17B. FIG. 17A shows the SQL generated for version 7 of Microsoft's RDB product called "SQL Server", and FIG. 17B shows the SQL generated for version 8 of Oracle's RDB product.

Referring again to FIG. 16, the first instruction 508 is a String instruction that generates a SQL comment 522, 528 which is useful should a human need to review the generated SQL file. The SQL comment 522, 528 includes the system-group's title from the content sub-tree as indicated by the Element element 510.

The second instruction 512 is a Row-Select instruction which generates a SQL select statement 524, 530 for purpose of converting the system-group's authorized role 504, which is depicted as a string, into an integer which is necessary when processing the next instruction 516. The system-group's authorized role 504 is extracted from the content sub-tree with the Element element 514.

The third instruction 516 is a Row-Insert instruction which generated a SQL insert statement 526, 530 instructing the SQL database 12 to add a new row, containing four columns, to the proper table in the SQL database 12. The first column is the system-group's ID 500, which is extracted from the content sub-tree with the Element element 518. The second column is the system-group's title, which is extracted from the content sub-tree with the Element element 520. The third column is the system-group's cardinality which is fixed at a constant value, which is why it is not represented in the content sub-tree. The fourth column is the system-group's authorized role, which is the integer that was selected by the previous Row-Select instruction 512.

Referring now to FIGS. 17A and 17B, each SQL database 12 vendor requires slightly different SQL syntax. The generated SQL from the example content sub-tree in FIG. 15 for a version 7 of a Microsoft SQL Server SQL database 12 is shown in FIG. 17A. The generated SQL from the example content sub-tree in FIG. 15 for a version 8 of an Oracle SQL database 12 is shown in FIG. 17B.

Referring to both FIGS. 17A and 17B, the SQL comment generated by instruction 508 is shown for Microsoft 522 and for Oracle 528, respectively. Note that the format of the comment does not vary between Microsoft and Oracle. The SQL select statement generated by instruction 512 is shown for Microsoft 524 and for Oracle 530. Note that the syntax for specifying the cursor receiving the result of the select statement differs between Microsoft and Oracle. Also not that the Microsoft SQL database 12 requires statements to be followed by the "go" keyword and where the Oracle SQL database 12 requires statements to be terminated with a semi-colon. The SQL insert statement generated by instruction 516 is shown for Microsoft 526 and for Oracle 532. The only difference in the generated insert statement between Microsoft and Oracle is the method for referencing the cursor returned by the SQL select statement 524, 530. The Microsoft and Oracle SQL databases also differ in how a transaction is specified. The Microsoft SQL database syntax requires that transactions be marked at the beginning 534 and at the end 536. The Oracle SQL database syntax requires only that transactions be delimited at the end 538. None of these vendor-specific syntax distinctions need to be taken into account when specifying the content sub-tree (FIG. 15) or the instruction sequence (FIG. 16).

Java source code for the enumeration routine and flow charts explaining the operation of the enumeration routine are attached hereto as an APPENDIX.

What is claimed is:

1. A method for automatically generating SQL by specifying sub-elements and attributes in a sub-tree and for extracting data values therefrom, comprising the steps of:

(a) defining content elements as recursively hierarchical sub-trees by defining a first XML ELEMENT in a document type definition, each content element including a top-level element and zero or more embedded subelements, and wherein leaf nodes in the sub-trees represent data values, the content elements further represented in an XML information set as objected-oriented content that is represented as a directed acyclic graph (DAG), where a child node may have multiple direct parents;

(b) extracting data values from the content elements by using the description of the first XML ELEMENT to recursively traverse each top-level element and extract the data values from the sub-tree;

(c) providing a first routine that accepts as parameters the description of the first XML ELEMENT, and a first top-level content element, and returns a string containing the data values extracted from the first top-level content element; and (d) using the string returned from the first routine to represent SQL statements that perform database functions.

2. The method of claim 1 wherein step (a) further includes the step of defining a first tag name in the first XML ELEMENT as either an XML "ELEMENT" or as an XML "ATTRIBUTE" (ATTLIST), wherein the XML "ELEMENT" defines what children an XML element bearing the first tag name may have, and the XML ATTRIBUTE defines what attributes an XML element bearing the first tag name may have.

3. The method of claim 2 wherein step (a) further includes the step of defining that a first child of the first XML ELEMENT may be may be an optional "link" followed by an optional "attribute" or a "sub-element".

4. The method of claim 3 wherein step (b) further includes the step of outputting SQL statements from the first routine that perform at least one of selecting table rows specified by the data values, inserting the data values into specified rows, and inserting comments into a SQL file.

5. A computer readable medium containing program instructions for automatically generating SQL by specifying sub-elements and attributes in a sub-tree and for extracting data values therefrom, the instructions for:

(a) defining content elements as recursively hierarchical sub-trees by defining a first XML ELEMENT in a document type definition, each content element including a top-level element and zero or more embedded subelements, and wherein leaf nodes in the sub-trees represent data values, the content elements further represented in an XML information set as objected-oriented content that is represented as a directed acyclic graph (DAG), where a child node may have multiple direct parents;

(b) extracting data values from the content elements by using the description of the first XML ELEMENT to recursively traverse each top-level element and extract the data values from the sub-tree;

(c) providing a first routine that accepts as parameters the description of the first XML ELEMENT, and a first top-level content element, and returns a string containing the data values extracted from the first top-level content element; and (d) using the string returned from the first routine to represent SQL statements that perform database functions.

6. The computer readable medium of claim 5 wherein instruction (a) further includes an instruction for defining a first tag name in the first XML ELEMENT as either an XML "ELEMENT" or as an XML "ATTRIBUTE" (ATTLIST), wherein the XML "ELEMENT" defines what children an XML element bearing the first tag name may have, and the XML ATTRIBUTE defines what attributes an XML element bearing the first tag name may have.

7. The computer readable medium of claim 6 wherein instruction (a) further includes an instruction for defining that a first child of the first XML ELEMENT may be may be an optional "link" followed by an optional "attribute" or a "sub-element".

8. The computer readable medium of claim 7 wherein instruction (b) further includes an instruction for outputting SQL statements from the first routine that perform at least one of selecting table rows specified by the data values, inserting the data values into specified rows, and inserting comments into a SQL file.

9. A computer system having a processor and memory for executing programs, comprising:

at least one XML information set, the XML information set including a sequence of objected-oriented content elements represented as a directed acyclic graph (DAG) where a child node may have multiple direct parents;

a document type definition (DTD) for defining each content element as a first XML ELEMENT that is a recursively hierarchical tree containing zero or more embedded content elements, wherein each content element is associated with a tag name, and wherein leaf nodes in the sub-trees represent data values; and a first routine for extracting data values from the content elements by using the description of the first XML ELEMENT to recursively traverse each top-level element and return a string containing the data values extracted from the sub-tree;

wherein the first routine uses the string to outputs SQL statements that perform at least one of selecting table rows specified by the data values, inserting the data values into specified rows, and inserting comments into a SQL file.

10. The system of claim 8 wherein the first routine that accepts as parameters the description of the first XML ELEMENT, and a first top-level content element, and returns a string containing the data values extracted from the first top-level content element.

11. The system of claim 10 wherein a first tag name for the first XML ELEMENT is defined in the DTD as either an XML "ELEMENT" or as an XML "ATTRIBUTE" (ATTLIST), wherein the XML "ELEMENT" defines what children an XML element bearing the first tag name may have, and the XML ATTRIBUTE defines what attributes an XML element bearing the first tag name may have.

12. The system of claim 10 wherein a first child of the first XML ELEMENT is defined as having an optional "link" followed by an optional "attribute" or a "sub-element".

* * * * *